United States Patent
Wasserman et al.

(10) Patent No.: US 12,335,331 B2
(45) Date of Patent: Jun. 17, 2025

(54) DYNAMIC SCALING OF A DISTRIBUTED COMPUTING SYSTEM

(71) Applicant: Red Hat, Inc., Raleigh, NC (US)

(72) Inventors: Orit Wasserman, Mitzpe Aviv (IL); Yehoshua Salomon, Kfar Saba (IL)

(73) Assignee: Red Hat, Inc., Raleigh, NC (US)

( * ) Notice: Subject to any disclaimer, the term of this patent is extended or adjusted under 35 U.S.C. 154(b) by 31 days.

(21) Appl. No.: 17/530,215

(22) Filed: Nov. 18, 2021

(65) Prior Publication Data
US 2023/0156071 A1 May 18, 2023

(51) Int. Cl.
*H04L 67/10* (2022.01)
*H04L 67/52* (2022.01)

(52) U.S. Cl.
CPC ............. *H04L 67/10* (2013.01); *H04L 67/52* (2022.05)

(58) Field of Classification Search
CPC ................................. H04L 67/10; H04L 67/52
See application file for complete search history.

(56) References Cited

U.S. PATENT DOCUMENTS

| | | | | |
|---|---|---|---|---|
| 7,512,702 B1 * | 3/2009 | Srivastava | .......... | H04L 67/1001 709/239 |
| 9,176,759 B1 * | 11/2015 | Sahasranaman | .... | G06F 9/45504 |
| 9,934,290 B1 | 4/2018 | Wang et al. | | |
| 10,230,683 B1 * | 3/2019 | Goodsitt | ............. | H04L 67/1006 |
| 11,030,169 B1 | 6/2021 | Wu et al. | | |
| 2010/0169477 A1 * | 7/2010 | Stienhans | ............. | G06F 9/5083 709/224 |
| 2015/0288753 A1 * | 10/2015 | He | ........................ | H04L 67/535 709/224 |
| 2016/0381093 A1 * | 12/2016 | Novo Diaz | ............. | H04L 47/17 370/270 |
| 2017/0220991 A1 | 8/2017 | Vasantham et al. | | |
| 2019/0108229 A1 * | 4/2019 | Sista | ................... | G06F 16/2282 |
| 2019/0116230 A1 * | 4/2019 | Schwab | ............. | G06F 12/0848 |
| 2019/0215272 A1 * | 7/2019 | Singh | .................. | H04L 47/2475 |
| 2019/0303164 A1 * | 10/2019 | King | ..................... | G06F 9/4881 |
| 2020/0026548 A1 | 1/2020 | Huang | | |

OTHER PUBLICATIONS

"Apache HBase™ Reference Guide," Apache HBase Team, 2020, https://hbase.apache.org/book.html.

* cited by examiner

*Primary Examiner* — Hua Fan
(74) *Attorney, Agent, or Firm* — Kilpatrick Townsend & Stockton LLP

(57) ABSTRACT

A technique for dynamic scaling of a distributed computing system is described. In one example of the present disclosure, a system can include a base node configured to provide an access point to a distributed computing system and for servicing a first portion of requests and to generate at least one compute node based on a first load of the base node. The system can also include the at least one compute node of the distributed computing system for servicing a second portion of requests. The at least one compute node can be configured to generate an additional compute node for servicing a subset of the second portion of requests based on a second load of the at least one compute node.

18 Claims, 8 Drawing Sheets

DYNAMIC SCALING OF A DISTRIBUTED COMPUTING SYSTEM

TECHNICAL FIELD

The present disclosure relates generally to distributed computing systems. More specifically, but not by way of limitation, this disclosure relates to dynamic scaling of a distributed computing system.

BACKGROUND

There are various types of distributed computing environments, such as cloud computing systems, computing clusters, and data grids. A distributed computing system can include multiple nodes (e.g., physical machines or virtual machines) in communication with one another over a network, such as a local area network or the Internet. Cloud computing systems have become increasingly popular. Cloud computing environments have a shared pool of computing resources (e.g., servers, storage, and virtual machines) that are used to provide services to developers on demand. These services are generally provided according to a variety of service models, such as Infrastructure as a Service, Platform as a Service, or Software as a Service. But regardless of the service model, cloud providers manage the physical infrastructures of the cloud computing environments to relieve this burden from developers, so that the developers can focus on deploying software applications.

DETAILED DESCRIPTION

Figure 1:
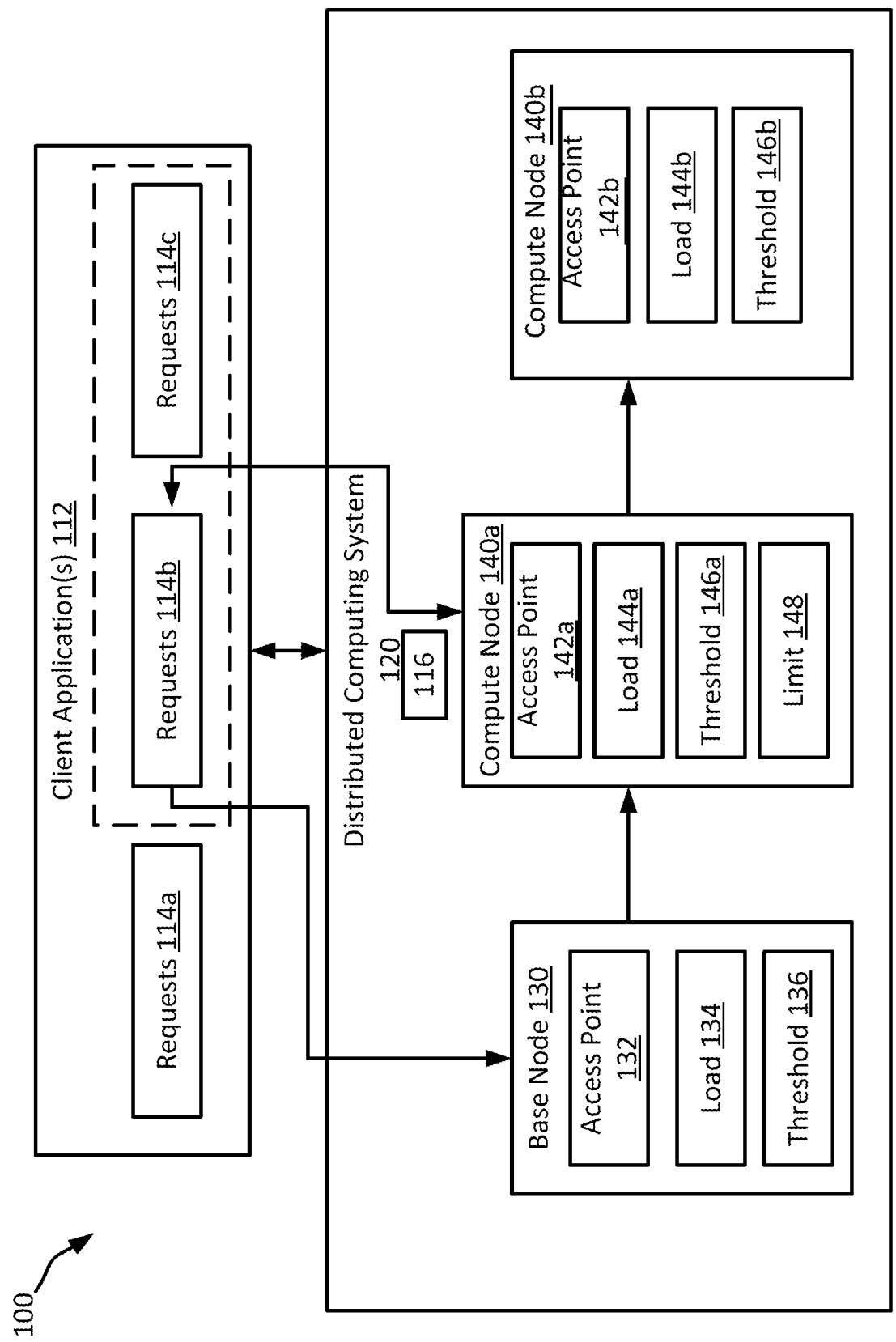
FIG. 1 shows a block diagram of an example of a system for implementing dynamic scaling of a distributed computing system according to some aspects of the present disclosure.

Distributed computing systems, such as cloud computing systems and cluster computing systems, can support dynamic expansion and shrinking of compute nodes. A distributed computing system typically involves a scaling management system with a proxy that may peek into the requests payload and performs redirections according to a scaling configuration. The scaling mechanism includes a central component for management and redirection associated with all nodes of the distributed computing system. The central component is a single point of failure and is often a bottleneck of the distributed computing system, since all requests and decisions are managed by the central component. As a result, the central component may be complex and expensive to implement.

Some examples of the present disclosure can overcome one or more of the abovementioned problems by providing a system with a scalable, self-managed scheme that does not involve a central component for the management and redirection. The system can include a base node for providing an access point to a distributed computing system and for serving a first portion of requests. The base node can generate at least one compute node based on a first load of the base node. The compute node can service a second portion of requests. The compute node can generate an additional compute node for servicing a subset of the second portion of requests based on a second load of the compute node. The compute node can also monitor its loads to determine when the compute node can be removed from the system. Since the base node and each of the compute nodes can monitor their respective loads and generate new nodes, the management and redirection of requests from client applications can be considered to be dynamic and self-managed. The system may add little payload that can enable client applications generating the requests to be updated about the dynamic changes while keeping the system functional for non-updated client applications. Additionally, there is no single point of failure of the distributed computing system, and without the bottleneck of the central component, performance of the distributed computing system can be improved.

As one example, a system can dynamically expand a number of compute nodes of a distributed computing system. The system can include a base node that provides ten client applications access to the distributed computing system. Each of the client applications can generate requests associated with a customer identifier (ID) associated with the request. The base node can monitor the load of requests received from the client applications. Upon determining that the load exceeds a first threshold, the base node can generate a compute node A for servicing a portion of the requests from the client applications. For example, the compute node A can service requests with an even customer ID (e.g., two, four, six, eight, and ten), while the base node continues to service requests with an odd customer ID (e.g., one, three, five, seven, and nine). The base node and the compute node A can then monitor their respective loads. If the compute node A determines that the load of the compute node A exceeds a second threshold, the compute node A can generate a compute node B. The compute node B can service requests for a portion of the requests serviced by the compute node A. For example, the compute node B can service requests with a customer ID that is divisible by four (e.g., four and eight). The base node, compute node A, and compute node B can continue monitoring their respective loads and generating additional compute nodes. Each additional compute node can also monitor their load and generate additional compute nodes. Since compute nodes can individually determine when to generate additional compute nodes, a central component is not needed for managing the expansion of the number of compute nodes.

As another example, a system can dynamically reduce a number of compute nodes of a distributed computing system. Node A, which may be a base node or a compute node, may have previously generated node B, which can be a compute node. Node B can determine a collective load of node A and node B is below a limit. As a result, node B can determine that it can unite with node A. Prior to determining to unite with node A, node A can receive a request having a customer ID associated with node B. Node A can forward the request to node B, which can respond with a response to the request, a notification of redirection to node B, and a validity time of five minutes for redirecting requests to node B. Subsequent to determining to unite with node A, node B can receive another request having a customer ID associated with node B. The request can be redirected from node B to node A. Node A can send a response to the request, a notification of the redirection to node A, and a validity time associated with the redirection. Once the initial validity time indicated in the response from node B has passed, node B can remove itself from the distributed computing system. Since compute nodes can individually determine when to be removed from the distributed computing system, a central component is not needed for managing the reduction of the number of compute nodes.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for implementing distributed scaling of a distributed computing system 120 according to some aspects of the present disclosure. The system 100 includes one or more client applications 112 in communication with the distributed computing system 120. The distributed computing system 120 may be a distributed storage system, a customer relationship management (CRM) system, or a cluster computing system. Each client application may be associated with one or more client devices that can access the distributed computing system 120. The client applications 112 can generate requests 114a-c. Examples of the client devices that the client applications 112 can be associated with are a laptop, desktop, mobile device, a server, or other computing device. The client applications 112 can access the distributed computing system 120 via one or more networks, such as a local area network or the Internet. A base node 130 of the distributed computing system 120 can provide an access point 132 for serving requests of the client applications 112. The access point 132 can include an Internet Protocol (IP) address and a port to the distributed computing system 120. The distributed computing system 120 can also include one or more compute nodes 140a-b. The compute nodes 140a-b can each be in communication with some or all of the client applications 112, the base node 130, the other compute nodes, or a combination thereof. Examples of the base node 130 and the compute nodes 140a-b include a bare metal server, a virtual server, or a proxy server that redirects requests to a highly available cluster, such as an active-passive cluster.

The distributed computing system 120 may initially include the base node 130 and neither the compute node 140a nor the compute node 140b. The base node 130 can service requests 114a-c for each of the client applications 112. The base node 130 can include a dynamic management function for monitoring a load 134 of the base node 130 and generating compute nodes accordingly. For example, the base node 130 may monitor a compute load, a network load, a memory load, a storage load, a combination thereof, etc. to determine when the load 134 exceeds a threshold 136. Upon determining that the load 134 exceeds the threshold 136, the base node 130 can generate the compute node 140a for servicing a portion of the requests 114a-c. For example, the base node 130 may service requests 114a and the compute node 140a may service requests 114b-c. The requests 114b-c can include a similar characteristic. For example, the requests 114a may be associated with an even customer ID and the requests 114b-c may be associated with an odd customer ID. In a CRM system, it may be beneficial to have all requests for a particular customer to be handled by same node. Otherwise, coordination between multiple nodes handling the requests for the customer can be complex and computationally expensive. Associating the requests 114a-c based on customer IDs can thus reduce the complexity and computation requirements of handling requests. Additionally or alternatively, the requests 114a-c may be distributed between the base node 130 and the compute node 140a based on a geographic location of the requests 114a-c, a hash value of a username included in the requests 114a-c, or any other function of the request input. For example, the requests 114a may be associated with Europe and the requests 114b-c may be associated with the United States.

In some examples, subsequent to the base node 130 generating the compute node 140a, the base node 130 and the compute node 140a can individually monitor their respective loads. For example, while the base node 130 continues to monitor the load 134, the compute node 140a can monitor a load 144a associated with the compute node 140a. If the base node 130 determines the load 134 again exceeds the threshold 136, the base node 130 can generate another compute node for servicing requests from a portion of the remaining requests associated with the base node 130. Additionally, if the compute node 140a determines the load 144a exceeds a threshold 146a, the compute node 140a can generate a compute node for servicing a portion of the requests associated with the compute node 140a. For example, the compute node 140a may be associated with the requests 114b-c and may determine the load 144a exceeds the threshold 146a. The compute node 140a can then generate compute node 140b for servicing either the requests 114b or the requests 114c. The compute node 140b can then monitor a load 144b associated with the compute node 140b and generate an additional compute node if the load 144b exceeds the threshold 146b. Each of the threshold 136 and the thresholds 146a-b may be equal or unequal.

Once the base node 130 generates the compute node 140a, the client applications 112 generating requests previously associated with the base node 130 and currently serviced by the compute node 140a may lack knowledge that the compute node 140a services the requests. For example, prior to the compute node 140a being generated, the base node 130 may service the requests 114b that are serviced by the compute node 140a once the compute node 140a is generated. The client applications 112 may not know the compute node 140a has been generated, so a client application of the client applications 112 can send a request of the requests 114b to the base node 130. Since the base node 130 generated the compute node 140a, the base node 130 can determine the compute node 140a services the requests 114b. The base node 130 can forward the request to the compute node 140a. The compute node 140a can then respond to the request with an indication 116 of the requests that are associated with the compute node 140a. For example, the indication 116 can indicate to the client applications 112 that the requests 114b are associated with the compute node 140a. The indication 116 may include customer IDs associated with the requests 114b that are associated with the compute node 140a, fields and values (e.g., cities and addresses) associated with the requests 114b that are associated with the compute node 140a, or a rule for determining the requests 114b that are associated with the compute node 140a. If the compute node 140a services the requests 114b with an odd customer ID, the rule may be customerID%2==1. Subsequent requests of the requests 114b can then be received by the compute node 140a without first being redirected by the base node 130.

In some examples, the compute nodes 140a-b can also determine when the compute nodes 140a-b are to be removed from the distributed computing system 120. A compute node that does not have a child, that is, a compute node without a generated compute node, can decide to unite with its parent node. The parent node is the node that generated the compute node. For example, if the distributed computing system 120 includes the base node 130 and the compute node 140a generated by the base node 130, the compute node 140a may decide to unite with the base node 130 at some point in time. The compute node 140a can determine whether a collective load of the base node 130 and the compute node 140a is below a limit 148. Additionally or alternatively, the base node 130 may determine whether the collective load is below the limit 148. The collective load can be a summation of the load 134 of the base node 130 and the load 144a of the compute node 140a. If the collective load is below the limit 148, the compute node 140a can be removed from the distributed computing system 120. Otherwise, the compute node 140a is to remain in the distributed computing system 120 for servicing a portion of the requests 114a-c.

To remove the compute node 140a from the distributed computing system 120 in response to determining that the collective load is below the limit 148, the compute node 140a can indicate a validity time to the client applications 112. The validity time can be a time length for which the compute node 140a services particular requests. For example, if the compute node 140a services the requests 114b-c and the compute node 140a receives a request redirected from the base node 130, the indication 116 sent to the client applications 112 in response to the request by the compute node 140a can include, in addition to the response to the request, a notification of a redirection of the request to the compute node 140a, and a validity time associated with the redirection. The notification of the redirection can be a redirection record and the validity time can be a validity period for the redirection record. As one particular example, the validity time may be five minutes. If the compute node 140a receives an additional request from the requests 114b-c within the validity period of the request but subsequent to determining to unite with the base node 130, the additional request can be redirected by the compute node 140a to the base node 130, which can respond to the additional request with an additional notification of redirection and validity time for the base node 130. Once the validity time for the redirection record of the compute node 140a has passed, the client applications 112 can no longer send requests to the compute node 140a, and instead can send additional requests to the base node 130, since routing to the compute node 104a is no longer valid. Subsequent to the validity time for the compute node 140a passing, the compute node 140a can be removed from the distributed computing system 120 and the base node 130 can service the requests 114b-c. The base node 130 may not have an expiry time and an address of the base node 130 can be part of an invariant configuration of the distributed computing system 120.

Removing the compute node 140b from the distributed computing system 120 can follow a similar process. The compute node 140b can determine a collective load of the loads 144a-b is below a limit and redirect requests to the compute node 140a. The compute node 140a can respond to the requests with the indication of the response to the request, the redirection to the compute node 140a, and a validity time associated with the redirection. After a validity time associated with the compute node 140b has passed, the compute node 140b can be removed from the distributed computing system 120 and the compute node 140a can service the requests previously associated with the compute node 140b.

Although FIG. 1 depicts a certain number and arrangement of components, other examples may include more components, fewer components, different components, or a different number of the components that is shown in FIG. 1. For instance, the distributed computing system 120 can include more base nodes than are shown in FIG. 1. Additionally, while two compute nodes are shown in FIG. 1, in other examples the distributed computing system 120 may include more or fewer compute nodes. Each of the compute nodes can include the dynamic management function for generating additional compute nodes and determining when to be removed from the distributed computing system 120.

Figure 2:
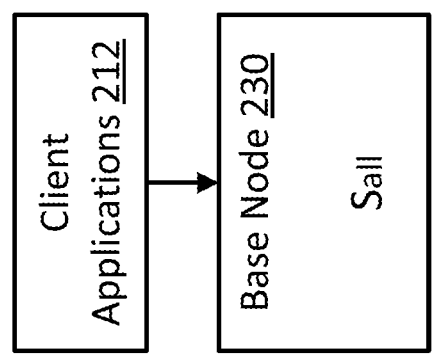
FIG. 2 shows a block diagrams of an example of a base node at an initial stage of dynamic scaling of a distributed computing system according to some aspects of the present disclosure.

FIG. 2 shows block diagrams of an example of a base node 230 at an initial stage of dynamic scaling of a distributed computing system according to some aspects of the present disclosure. A single server, illustrated as the base node 230a, can handle all requests from client applications 212, as indicated by $S_{all}$. A system with only the base node 230a can be considered an initial state of the system. The base node 230a can monitor a load of the base node 230a, and when the load exceeds a threshold the base node 230a can spawn a new compute node for serving part of the requests from the client applications 212. The threshold may be based on quality of service (QoS) targets.

Figure 3:
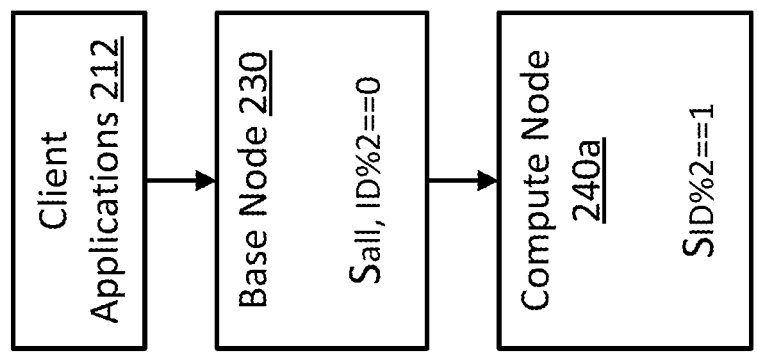
FIG. 3 shows a block diagrams of an example of nodes after a first expansion of a distributed computing system according to some aspects of the present disclosure.

FIG. 3 show block diagrams of an example of nodes after a first expansion of a distributed computing system according to some aspects of the present disclosure. The base node 230 is illustrated as having generated a compute node 240a for serving a portion of the requests from the client applications 212. The base node 230 can be a gateway to all requests and can handle requests with even customer ID numbers, as indicated by $S_{all,ID\%2==0}$. The compute node 240a can handle requests with odd customer IDs, as indicated by $S_{ID\%2==1}$. The client applications 212 may not be aware of the change, so a next call can route to the base node 230 even if the customer ID is odd. If the customer ID is odd, base node 230 re-routes the request to the compute node 240a. The compute node 240a handles the request and the response returns information about the requests that the compute node 240a handles. The response information can be in different semantics, such as the customer ID, a range of customer IDs, groups of fields and values or rules. The most efficient response information may be to return the rule of customerID%2==1. Other examples may include a value of customerAddress.City in a group of cities, or anything else. After a single call that is forwarded from the base node 230 to the compute node 240a, the client applications 212 have updated information and send subsequent requests to the compute node 240a directly.

Figure 4:
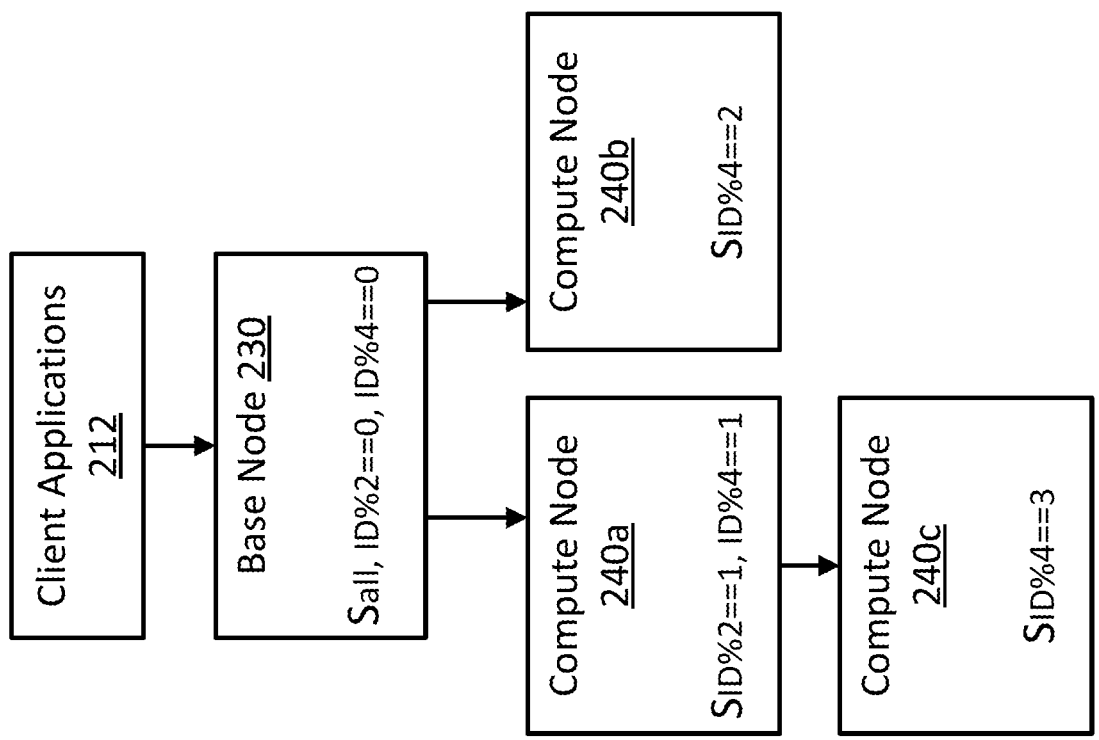
FIG. 4 shows a block diagrams of an example of nodes after additional expansions of a distributed computing system according to some aspects of the present disclosure.

FIG. 4 shows block diagrams of an example of nodes after additional expansions of a distributed computing system according to some aspects of the present disclosure. The base node 230 is illustrated as having generated another compute node, illustrated as compute node 240b. The compute node 240a is also illustrated as having generated compute node 240c. The base node 230 generates the compute node 240b based on a load of the base node 230 exceeding a first threshold, and the compute node 240a generates the compute node 240a based on a load of the compute node 240a exceeding a second threshold. In this case, if a request with customerID%4==3 is routed to the base node 230, the request can be routed twice until the request reaches the compute node 240c, but the response can provide the client applications 212 with information about which requests to route to the compute node 240c on subsequent calls.

Although FIG. 4 shows a tree with all branches having a same height, the tree can develop in every direction according to the load, which may create an asymmetrical tree. For example one node may handle all the odd customer IDs, and four nodes can handle even customer IDs according to the residue from dividing the ID by eight.

Figure 5:
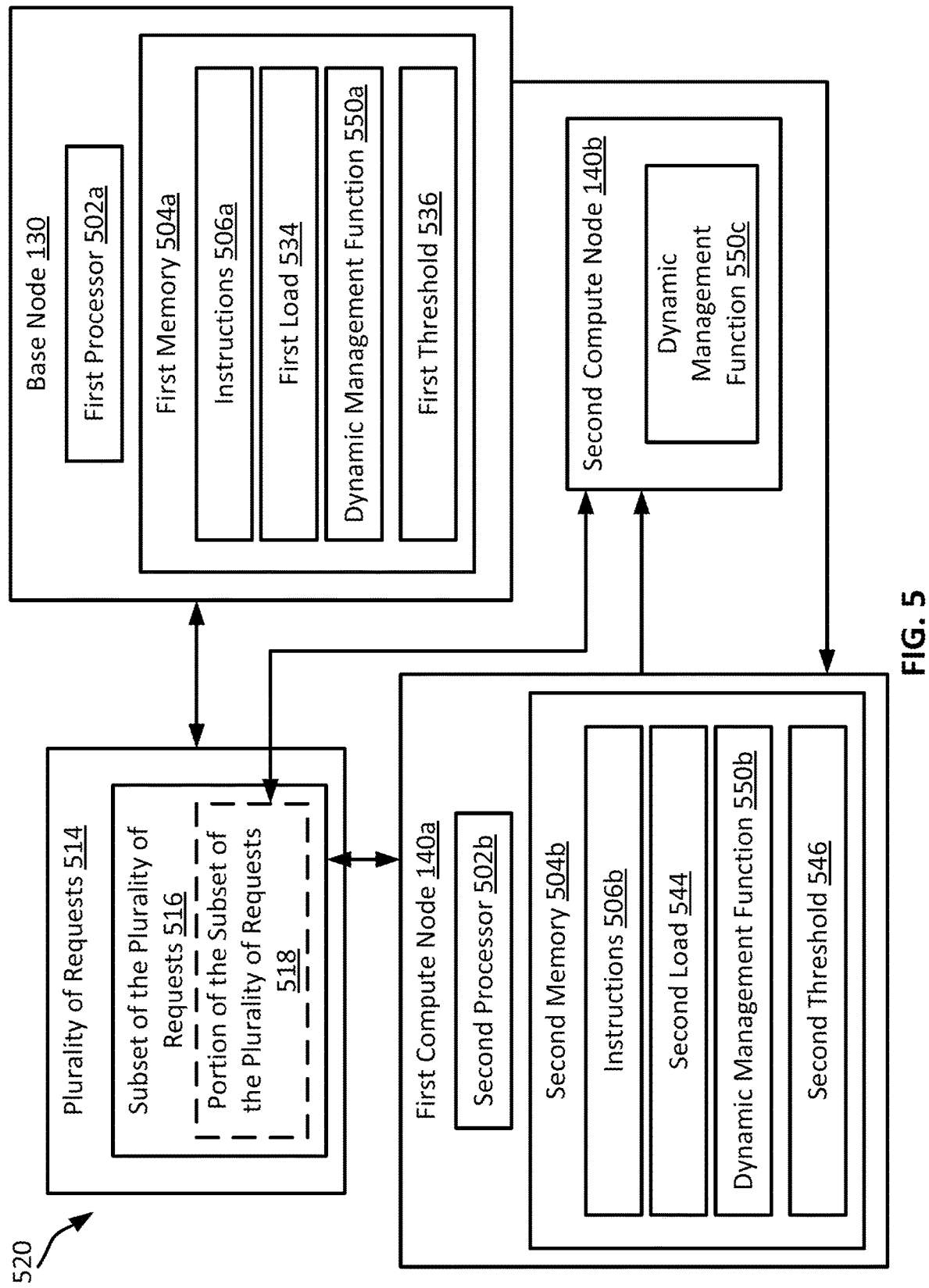
FIG. 5 shows a block diagram of an example of a system for implementing dynamic expansion of a distributed computing system according to some aspects of the present disclosure.

FIG. 5 shows a block diagram of an example of a system for implementing dynamic expansion of a distributed computing system 520 according to some aspects of the present disclosure. The distributed computing system 520 includes a first processor 502a that is communicatively coupled to a first memory 504a. In some examples, the first processor 502a and the first memory 504a can be part of the same computing device, such as a base node 130. In other examples, the first processor 502a and the first memory 504a can be distributed from (e.g., remote to) one another. The distributed computing system 520 also includes a second processor 502b that is communicatively coupled to a second memory 504b. In some examples, the second processor 502b and the second memory 504b can be part of the same computing device, such as a first compute node 140a. In other examples, the second processor 502b and the second memory 504b can be distributed from (e.g., remote to) one another.

The first processor 502a and the second processor 502b can each include one processor or multiple processors. Non-limiting examples of the first processor 502a and the second processor 502b include a Field-Programmable Gate Array (FPGA), an application-specific integrated circuit (ASIC), or a microprocessor. The first processor 502a can execute instructions 506a stored in the first memory 504a to perform operations. The second processor 502b can execute instructions 506b stored in the second memory 504b to perform operations. The instructions 506a-b may include processor-specific instructions generated by a compiler or an interpreter from code written in any suitable computer-programming language, such as C, C++, C#, Java, or Python.

The first memory 504a and the second memory 504b can each include one memory or multiple memories. The first memory 504a and the second memory 504b can be volatile or non-volatile. Non-volatile memory includes any type of memory that retains stored information when powered off. Examples of the first memory 504a and the second memory 504b include electrically erasable and programmable read-only memory (EEPROM) or flash memory. At least some of the first memory 504a can include a non-transitory computer-readable medium from which the first processor 502a can read instructions 506a. At least some of the second memory 504b can include a non-transitory computer-readable medium from which the second processor 502b can read instructions 506b. A non-transitory computer-readable medium can include electronic, optical, magnetic, or other storage devices capable of providing the first processor 502a and the second processor 502b with computer-readable instructions or other program code. Examples of a non-transitory computer-readable medium can include a magnetic disk, a memory chip, ROM, random-access memory (RAM), an ASIC, a configured processor, and optical storage.

The first processor 502a can execute the instructions 506a to perform operations. For example, the first processor 502a can determine a first load 534 associated with the base node 130 of the distributed computing system 520 having a dynamic management function 550a exceeds a first threshold 536. The first load 534 can be a compute load, network load, memory load, storage load, a combination thereof, etc. corresponding to a plurality of requests 514 of the distributed computing system 520. The plurality of requests 514 can be generated by a plurality of client applications. In response to determining that the first load 534 exceeds the first threshold 536, the first processor 502a can generate, by the base node 130, the first compute node 140a for servicing a subset of the plurality of requests 516 of the distributed computing system 520. The subset of the plurality of requests 516 can have a similar characteristic, such as a customer ID, geographic location, or username hash value that meets a particular criteria.

The first compute node 140a can have the dynamic management function 550b, and the second processor 502b can execute the instructions 506b to perform operations. For example, the second processor 502b can determine, by the first compute node 140a, a second load 544 associated with the first compute node 140a exceeds a second threshold 546. In response to determining the second load 544 exceeds the second threshold 546, the second processor 502b can generate, by the first compute node 140a, a second compute node 140b for servicing a portion of the subset of the plurality of requests 518 of the distributed computing system 520. The second compute node 140b can have the dynamic management function 550c. Accordingly, each node of the distributed computing system 520 can monitor their respective loads and generate additional compute nodes to service a portion of their associated requests. Thus, the distributed computing system 520 does not include a central management component that may be a bottleneck for the system when the central management component controls the generation of compute nodes.

Figure 6:
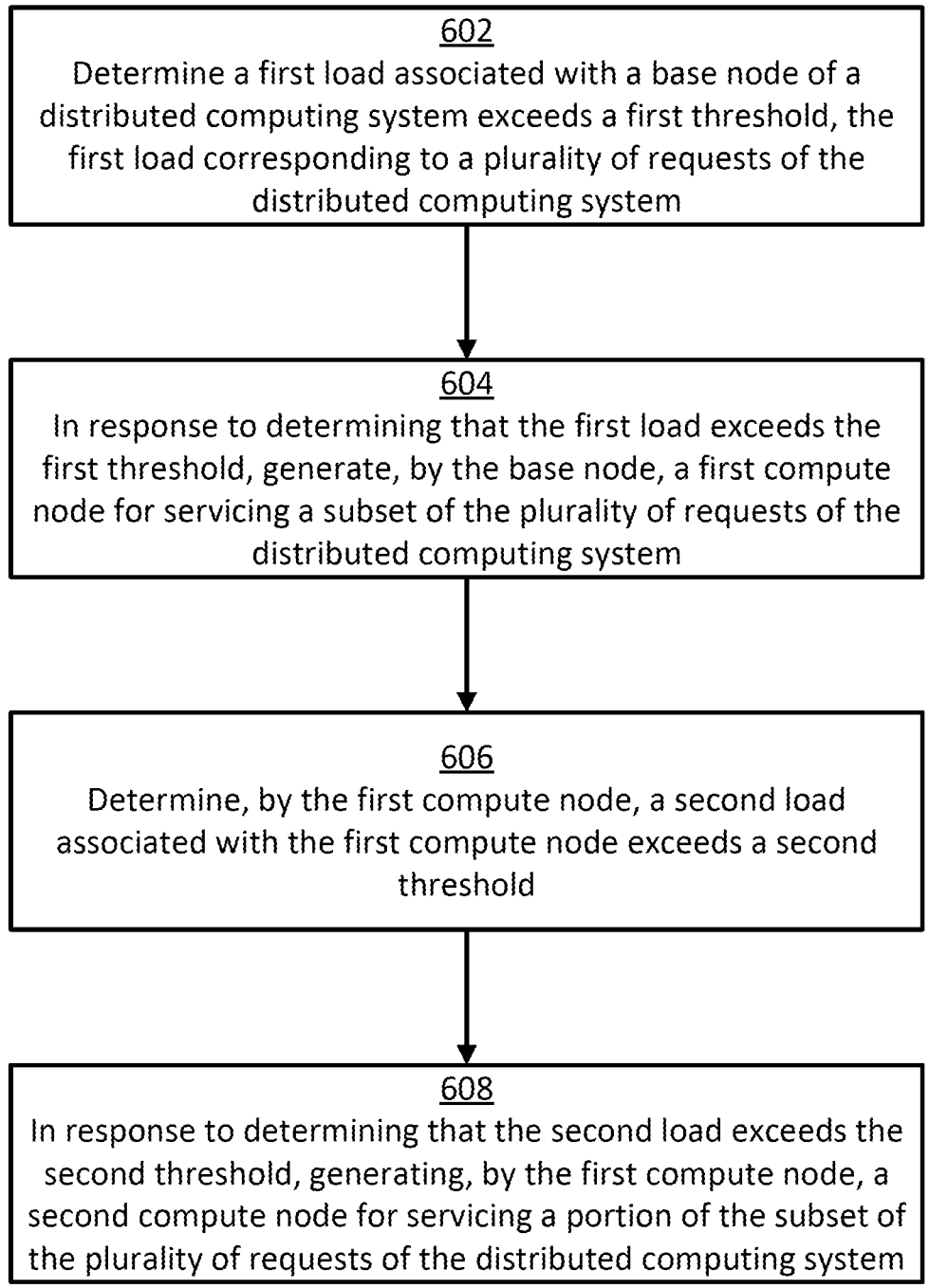
FIG. 6 shows a flow chart of an example of a process for implementing dynamic expansion of a distributed computing system according to some aspects of the present disclosure.

FIG. 6 shows a flow chart of a process for implementing dynamic expansion of a distributed computing system according to some aspects of the present disclosure. Other examples can include more steps, fewer steps, different steps, or a different order of the steps than is shown in FIG. 6. The steps of FIG. 6 are discussed below with reference to the components discussed above in relation to FIG. 5.

In block 602, a first processor 502a can determine a first load 534 associated with a base node 130 of a distributed computing system 520 exceeds a first threshold 536. The first load 534 can correspond to a plurality of requests 514 of the distributed computing system 520. The first load 534 can be a compute load, a network load, storage load, memory load, a combination thereof, etc. associated with the base node 130. The plurality of requests 514 can be associated with a first geographic region, a first portion of customer IDs, or a combination thereof. The base node 130 can provide an access point for client applications that generate the plurality of requests 514 to the distributed computing system 520.

In block 604, in response to determining that the first load 534 exceeds the first threshold 536, the first processor 502a can generate, by the base node 130, a first compute node 140a for servicing a subset of the plurality of requests 516 of the distributed computing system 520. The subset of the plurality of requests 516 can be associated with a second geographic region within the first geographic region, a second portion of customer IDs (e.g., even customer IDs), or a combination thereof. Once the first compute node 140a is generated, a request associated with the first compute node 140a may initially be received by the base node 130 and redirected to the first compute node 140a. The first compute node 140a can respond to the request with an indication of the subset of the plurality of requests 516 that are associated with the first compute node 140a.

In block 606, a second processor 502b of the first compute node 140a can determine a second load 544 associated with the first compute node 140a exceeds a second threshold 546. The second load 544 can correspond to the subset of the plurality of requests 516 of the distributed computing system 520. The second load 544 can be a compute load, a network load, a memory load, a storage load, a combination thereof, etc. associated with the first compute node 140a.

In block 608, in response to determining the second load 544 exceeds the second threshold 546, the second processor 502b can generate, by the first compute node 140a, a second compute node 140b for servicing a portion of the subset of the plurality of requests 518 of the distributed computing system 520. The portion of the subset of the plurality of requests 518 can be associated with a third geographic region within the second geographic region, a second portion of customer IDs within the first portion of customer IDs, or a combination thereof. The second compute node 140b can monitor an associated load of the second compute node 140b and generate additional compute nodes for further distributing the plurality of requests 514 across the base node 130 and the compute nodes.

Figure 7:
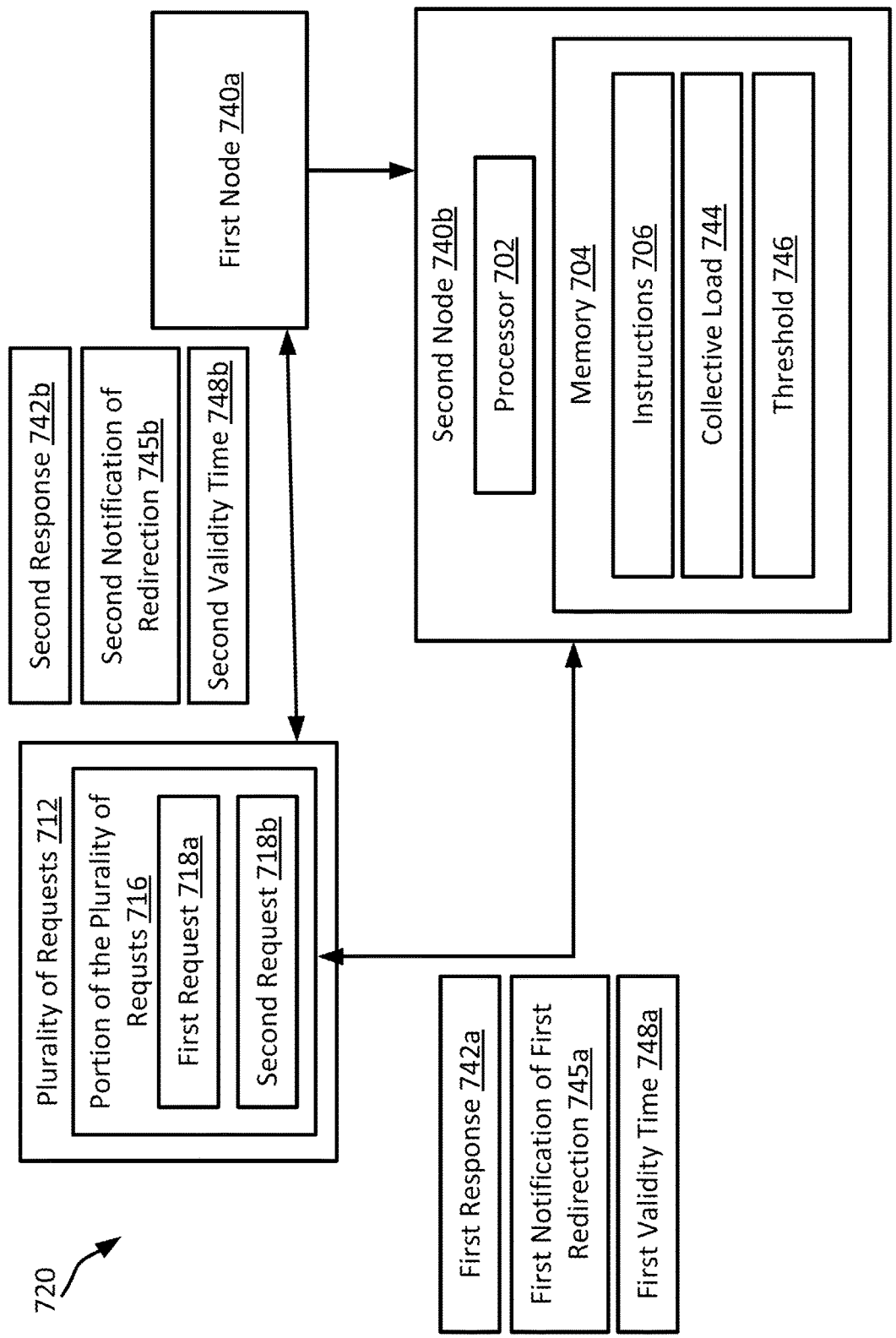
FIG. 7 shows a block diagram of an example of a system for implementing dynamic reduction of a distributed computing system according to some aspects of the present disclosure.

FIG. 7 shows a block diagram of an example of a system for implementing dynamic reduction of a distributed computing system 720 according to some aspects of the present disclosure. The distributed computing system 720 includes a second node 740b with a processor 702 communicatively coupled to a memory 704. The second node 740b can be communicatively coupled to a first node 740a. The first node 740a may be a base node (e.g., base node 130 in FIGS. 1 and 5) or a first compute node (e.g., first compute node 140a in FIGS. 1 and 5). If the first node 740a is the base node, the second node 740b may be the first compute node. If the first node 740a is the first compute node, the second node 740b can be a second compute node (e.g., second compute node 140b in FIGS. 1 and 5).

The processor 702 can execute instructions 706 stored in memory 704 to perform operations, such as any of the operations described herein. If the second node 740b is the first compute node, the instructions 706 can be the instructions 506b in FIG. 5. For example, the processor 702 can receive, from the first node 740a and by the second node 740b, a first request 718a associated with the second node 740b. The second node 740b can be previously generated by the first node 740a. The first node 740a can be associated with a plurality of requests 712 of the distributed computing system 720 and the second node 740b can be associated with a portion of the plurality of requests 716. The second node 740b can respond to the first request 718a with a first response 742a to the first request 718a, a first notification of a first redirection 745a to the second node 740b, and a first validity time 748a for the first redirection. The second node 740b can determine a collective load 744 of the first node 740a and the second node 740b is below a threshold 746. Subsequent to determining the collective load 744 is below the threshold 746, the second node 740b can receive a second request 718b associated with the second node 740b. The second node 740b can redirect the second request 718b to the first node 740a. The first node 740a can then send a second response 742b to the second request 718b, a second notification of a second redirection 745b, and a second validity time 748b associated with the second redirection. Subsequent to the first validity time 748a passing since a latest request served by the second node 740b, the second node 740b can be removed from the distributed computing system 720. Accordingly, each node of the distributed computing system 720 can monitor their respective loads and remove themselves from the distributed computing system 720 to minimize resources used by the distributed computing system 720.

Figure 8:
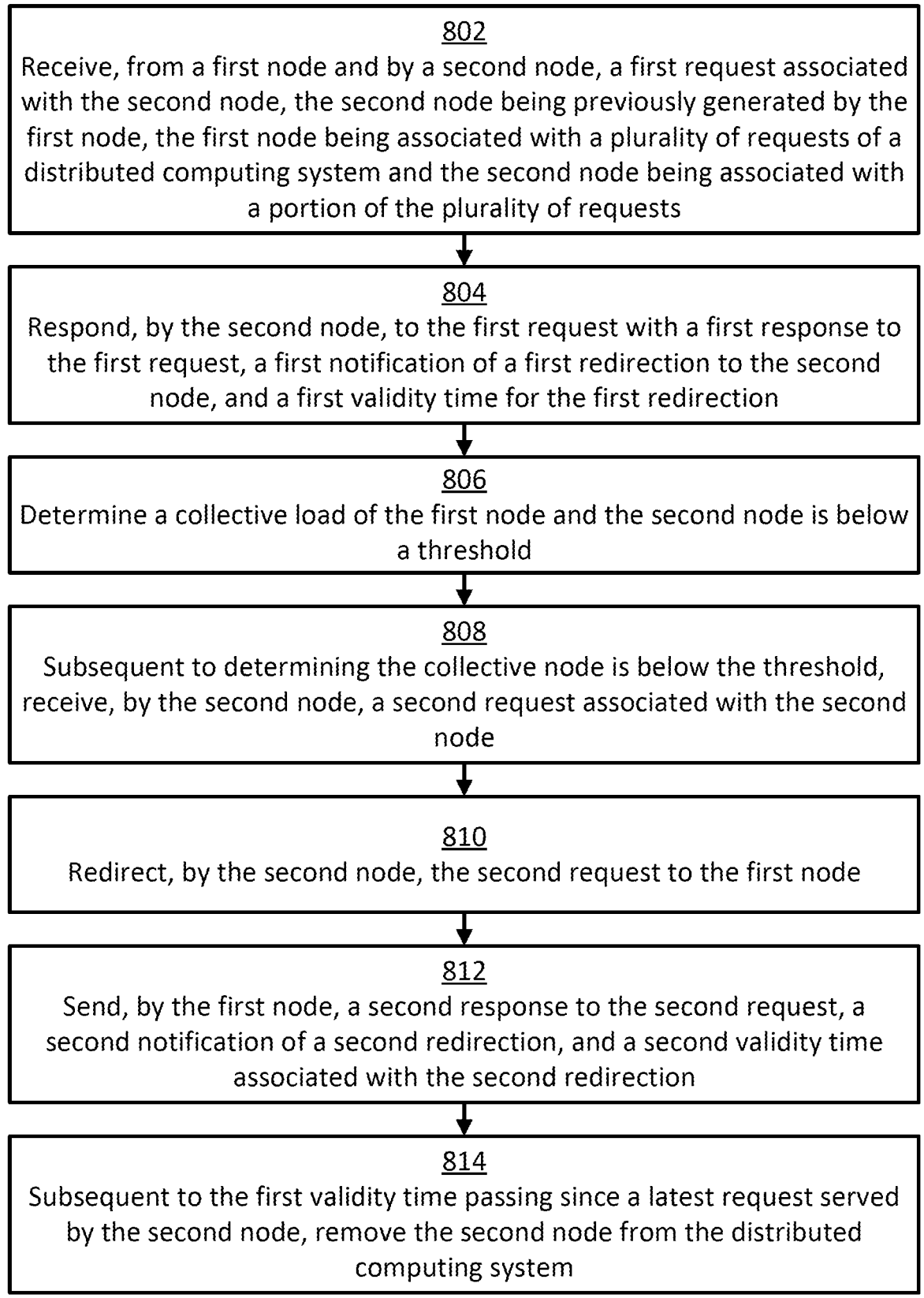
FIG. 8 shows a flow chart of an example of a process for implementing dynamic reduction of a distributed computing system according to some aspects of the present disclosure.

FIG. 8 shows a flow chart of an example of a process for implementing dynamic reduction of a distributed computing system according to some aspects of the present disclosure. Other examples can include more steps, fewer steps, different steps, or a different order of the steps than is shown in FIG. 8. The steps of FIG. 8 are discussed below with reference to the components discussed above in relation to FIG. 7.

In block 802, a processor 702 can receive, from a first node 740a and by a second node 740b, a first request 718a associated with the second node 740b. The second node 740b can be previously generated by the first node 740a. The first node 740a may correspond to a base node (e.g., base node 130 in FIGS. 1 and 5) or a first compute node (e.g., first compute node 140a in FIGS. 1 and 5). If the first node 740a is the base node, the second node 740b can correspond to the first compute node. If the first node 740a is the first compute node, the second node 740b can correspond to a second compute node (e.g., second compute node 140b in FIGS. 1 and 5). The first node 740a can be associated with a plurality of requests 712 from client applications of a distributed computing system 720 and the second node 740b can be associated with a portion of the plurality of requests 716. The plurality of requests 712 can be associated with a first geographic region, a first portion of customer IDs, or a combination thereof, and the portion of the plurality of requests 716 can be associated with a second geographic region within the first geographic region, a second portion of customer IDs (e.g., even customer IDs), or a combination thereof.

In block 804, the processor 702 can respond, by the second node 740b, to the first request 718a with a first response 742a to the first request 718a, a first notification of a first redirection 745a to the second node 740b, and a first validity time 748a for the first redirection. For example, the first validity time 748a may be three minutes, so requests associated with the second node 740b within the first validity time 748b can be automatically sent to the second node 740b without first being sent to and redirected by the first node 740a.

In block 806, the processor 702 can determine a collective load 744 of the first node 740a and the second node 740b is below a threshold 746. The first node 740a or the second node 740b may determine that the collective load 744 is below the threshold 746.

In block 808, subsequent to determining the collective load 744 is below the threshold 746, the processor 702 can receive a second request 718b associated with the second node 740b. The client application sending the second request 718*b* may have previously been notified that the second node 740*b* is associated with the second request 718*b*.

In block 810, the processor 702 can redirect the second request 718*b* to the first node 740*a*. The second request 718*b* can be redirected after the first node 740*a* and the second node 740*b* decide collectively to remove the second node 740*b* from the distributed computing system 720 since the collective load 744 is below the threshold 746.

In block 812, the first node 740*a* can send a second response 742*b* to the second request 718*b*, a second notification of a second redirection 745*b*, and a second validity time 748*b* associated with the second redirection. The second notification of the second redirection 745*b* can indicate that the first node 740*a* is associated with the second request 718*b*. The second validity time 748*b* can be a time associated with an expiration of the second redirection. For example, the second validity time 748*b* may be one minute, indicating that after one minute has passed, the first node 740*a* may no longer be associated with the second request 718*b*.

In block 814, subsequent to the first validity time 748*a* passing since a latest request served by the second node 740*b*, the processor 702 can remove the second node 740*b* from the distributed computing system 720. Once the first validity time 748*a* passes, any redirection to the second node 740*b* indicated to the client applications for the portion of the plurality of requests 716 is expired, so the client applications send requests to a base node, which may be the first node 740*a*. As a result, the client applications will not attempt to send a request to the second node 740*b* subsequent to the second node 740*b* being removed from the distributed computing system.

As used below, any reference to a series of examples is to be understood as a reference to each of those examples disjunctively (e.g., "Examples 1-4" is to be understood as "Examples 1, 2, 3, or 4").

Example 1 is a system comprising: a base node configured to provide an access point to a distributed computing system and for servicing a first portion of requests and to generate at least one compute node based on a first load of the base node, the at least one compute node configured to service a second portion of requests and to generate an additional compute node for servicing a subset of the second portion of requests based on a second load of the at least one compute node.

Example 2 is the system of example(s) 1, wherein the base node is further configured to: receive, subsequent to generating the at least one compute node, a request associated with the at least one compute node; send the request to the at least one compute node; and wherein the at least one compute node is further configured to: receive the request from the base node; and respond to the request with an indication of the second portion of requests associated with the at least one compute node.

Example 3 is the system of example(s) 2, wherein the indication of the second portion of requests includes customer identifiers associated with the second portion of requests, fields and values associated with the second portion of requests, or a rule for determining requests associated with the second portion of requests.

Example 4 is the system of example(s) 1, wherein the base node is configured to generate the at least one compute node for servicing the second portion of requests by: determining the first load associated with the base node exceeds a first threshold, the first load corresponding to the first portion of requests; and in response to determining that the first load exceeds the first threshold, generating, by the base node, the at least one compute node for servicing the second portion of requests.

Example 5 is the system of example(s) 4, wherein the at least one compute node is configured to generate the additional compute node for servicing the subset of the second portion of requests by: determining, by the at least one compute node, the second load associated with the at least one compute node exceeds a second threshold; and in response to determining the second load exceeds the second threshold, generating, by the at least one compute node, the additional compute node for servicing the subset of the second portion of requests.

Example 6 is the system of example(s) 2, wherein the indication of the second portion of requests comprises a first notification of a first redirection to the at least one compute node and a first validity time for the first redirection, and the at least one compute node is further configured to: determine a collective load of the base node and the at least one compute node is below a limit; subsequent to determining the collective load is below the limit, receive, by the at least one compute node, an additional request associated with the at least one compute node; redirect, by the at least one compute node, the additional request to the base node; send, by the base node, a response to the additional request, a second notification of a second redirection of the additional request, and a second validity time associated with the second redirection; and subsequent to the first validity time passing, shut down the at least one compute node.

Example 7 is the system of example(s) 1, wherein the additional compute node is configured to generate another compute node for servicing a portion of the subset of the second portion of requests.

Example 8 is a method comprising: determining a first load associated with a base node of a distributed computing system exceeds a first threshold, the first load corresponding to a plurality of requests of the distributed computing system; in response to determining that the first load exceeds the first threshold, generating, by the base node, a first compute node for servicing a subset of the plurality of requests of the distributed computing system; determining, by the first compute node, a second load associated with the first compute node exceeds a second threshold; and in response to determining that the second load exceeds the second threshold, generating, by the first compute node, a second compute node for servicing a portion of the subset of the plurality of requests of the distributed computing system.

Example 9 is the method of example(s) 8, further comprising: receiving, from the base node by the first compute node, a request associated with the first compute node; and responding to the request with an indication of the subset of the plurality of requests associated with the first compute node.

Example 10 is the method of example(s) 9, wherein the indication of the subset of the plurality of requests includes customer identifiers associated with the subset of the plurality of requests, fields and values associated with the subset of the plurality of requests, or a rule for determining requests associated with the subset of the plurality of requests.

Example 11 is the method of example(s) 9, wherein the indication of the subset of the plurality of requests associated with the first compute node comprises a first notification of a first redirection to the first compute node and a first validity time for the first redirection, the method further comprising: determining a collective load of the first load and the second load is below a limit; subsequent to determining the collective load is below the limit, receiving, at the first compute node, an additional request associated with the first compute node; redirecting, by the first compute node, the additional request to the base node; sending, by the base node, a response to the additional request, a second notification of a second redirection of the additional request, and a second validity time associated with the redirection; and subsequent to the first validity time passing since a latest request served by the first compute node, shut down the first compute node.

Example 12 is the method of example(s) 8, wherein the base node is configured to provide an access point to the distributed computing system.

Example 13 is the method of example(s) 8, wherein the plurality of requests corresponds to a first plurality of requests associated with a first geographic region, the subset of the plurality of requests corresponds a second plurality of requests associated with a second geographic region within the first geographic region, and the portion of the subset of the plurality of requests corresponds to a third plurality of requests associated with a third geographic region within the second geographic region.

14. A non-transitory computer-readable medium comprising first program code executable by a first processor for causing the first processor to: determine a first load associated with a base node of a distributed computing system having a dynamic management function exceeds a first threshold, the first load corresponding to a plurality of requests of the distributed computing system; in response to determining that the first load exceeds the first threshold, generate, by the base node, a first compute node for servicing a subset of the plurality of requests of the distributed computing system, the first compute node having the dynamic management function and second program code executable by a second processor for causing the second processor to: determine, by the first compute node, a second load associated with the first compute node exceeds a second threshold; and in response to determining the second load exceeds the second threshold, generate, by the first compute node, a second compute node for servicing a portion of the subset of the plurality of requests of the distributed computing system, the second compute node having the dynamic management function.

Example 15 is the non-transitory computer-readable medium of example(s) 14, wherein the second program code is further executable by the second processor for causing the second processor to: receive, from the base node and at the first compute node, a request associated with the first compute node; and respond to the request, by the first compute node, with an indication of the subset of the plurality of requests associated with the first compute node.

Example 16 is the non-transitory computer-readable medium of example(s) 15, wherein the indication of the subset of the plurality of requests includes customer identifiers associated with the subset of the plurality of requests, fields and values associated with the subset of the plurality of requests, or a rule for determining requests associated with the subset of the plurality of requests.

Example 17 is the non-transitory computer-readable medium of example(s) 15, wherein the indication of the subset of the plurality of requests associated with the first compute node comprises a first notification of a first redirection to the first compute node and a first validity time for the first redirection, and the second program code is further executable by the second processor for causing the second processor to: determine a collective load of the first load and the second load is below a limit; subsequent to determining the collective load is below the limit, receive, at the first compute node, an additional request associated with the first compute node; redirect, by the first compute node, the additional request to the base node; send, by the base node, a response to the additional request, a second notification of a second redirection of the additional request, and a second validity time associated with the second redirection; and subsequent to the first validity time passing since a latest request served by the first compute node, shut down the first compute node.

Example 18 is the non-transitory computer-readable medium of example(s) 14, wherein the base node is configured to provide an access point to the distributed computing system.

Example 19 is the non-transitory computer-readable medium of example(s) 14, wherein the plurality of requests corresponds to a first plurality of requests associated with a first geographic region, the subset of the plurality of requests corresponds a second plurality of requests associated with a second geographic region within the first geographic region, and the portion of the subset of the plurality of requests corresponds to a third plurality of requests associated with a third geographic region within the second geographic region.

Example 20 is the non-transitory computer-readable medium of example(s) 14, wherein the first threshold and the second threshold are equal.

Example 21 is a method comprising: receiving, from a first node and by a second node, a first request associated with the second node, the second node being previously generated by the first node, the first node being associated with a plurality of requests of a distributed computing system and the second node being associated with a portion of the plurality of requests; responding, by the second node, to the first request with a first response to the first request, a first notification of a first redirection to the second node, and a first validity time for the first redirection; determining a collective load of the first node and the second node is below a threshold; subsequent to determining the collective load is below the threshold, receiving, by the second node, a second request associated with the second node; redirecting, by the second node, the second request to the first node; sending, by the first node, a second response to the second request, a second notification of a second redirection, and a second validity time associated with the second redirection; and subsequent to the first validity time passing since a latest request served by the second node, removing the second node from the distributed computing system.

Example 22 is the method of example(s) 21, wherein generating the second node comprises: determining a first load associated with the first node exceeds a first threshold, the first load corresponding to the plurality of requests; and in response to determining that the first load exceeds the first threshold, generating, by the first node, the second node for servicing the portion of the plurality of requests.

Example 23 is the method of example(s) 21, wherein the first node comprises a base node configured to provide an access point to the distributed computing system.

Example 24 is the method of example(s) 21, further comprising: receiving, by the second node, the first request associated with the second node from the first node: and responding to the first request with an indication of the portion of the plurality of requests associated with the second node.

Example 25 is the method of example(s) 24, wherein the indication includes the first response to the first request, the first notification of the first redirection of the first request, and the first validity time associated with the first redirection.

Example 26 is a system comprising: a processor; and a memory including instructions that are executable by the processor for causing the processor to: receive, from a first node and by a second node, a first request associated with the second node, the second node being previously generated by the first node, the first node being associated with a plurality of requests of a distributed computing system and the second node being associated with a portion of the plurality of requests; respond, by the second node, to the first request with a first response to the first request, a first notification of a first redirection to the second node, and a first validity time for the first redirection; determining a collective load of the first node and the second node is below a threshold; subsequent to determining the collective load is below the threshold, receiving, by the second node, a second request associated with the second node; redirecting, by the second node, the second request to the first node; sending, by the first node, a second response to the second request, a second notification of a second redirection, and a second validity time associated with the second redirection; and subsequent to the first validity time passing since a latest request served by the second node, removing the second node from the distributed computing system.

Example 27 is the system of example(s) 26, wherein the memory further includes instructions that are executable by the processor for causing the processor to generate the second node by: determining a first load associated with the first node exceeds a first threshold, the first load corresponding to the plurality of requests; and in response to determining that the first load exceeds the first threshold, generating, by the first node, the second node for servicing the portion of the plurality of requests.

Example 28 is the system of example(s) 26, wherein the first node comprises a base node configured to provide an access point to the distributed computing system.

Example 29 is the system of example(s) 26, wherein the memory further includes instructions that are executable by the processor for causing the processor to: receive, by the second node, the first request associated with the second node from the first node; and respond to the first request with an indication of the portion of the plurality of requests associated with the second node.

Example 30 is the system of example(s) 29, wherein the indication includes the first response to the first request, the first notification of the first redirection of the first request, and the first validity time associated with the first redirection.

Example 31 is a system comprising: first processing means for providing an access point to a distributed computing system and for servicing a plurality of requests and for generating second processing means based on a first load of the first processing means; and the second processing means of the distributed computing system for servicing at least a subset of the plurality of requests, the second processing means configured to generate an additional processing means for servicing a subgroup of the subset of the plurality of requests based on a second load of the second processing means.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processing device; and
a memory device comprising instructions executable by the processing device to cause the processing device to:
provide, by a base node of a distributed computing system, an access point to the distributed computing system, the base node having a dynamic management function;
service, by the base node, a first portion of requests of the distributed computing system having a first shared characteristic, wherein the first portion of requests are associated with a first geographic region;
generate at least one compute node based on a first load of the base node, the at least one compute node having the dynamic management function and configured to service a second portion of requests having a second shared characteristic and to generate an additional compute node for servicing a subset of the second portion of requests having a third shared characteristic based on a second load of the at least one compute node, wherein the second portion of requests are associated with a second geographic region within the first geographic region, and wherein the subset of the second portion of the requests are associated with a third geographic region within the second geographic region; and
send, by the base node and in response to receiving a request associated with the at least one compute node from a client application, the request to the at least one compute node, the at least one compute node being configured to provide a response to the request to the client application.

2. The system of claim 1,
wherein the at least one compute node is further configured to respond to the request with an indication of the second portion of requests associated with the at least one compute node.

3. The system of claim 2, wherein the indication of the second portion of requests includes customer identifiers associated with the second portion of requests, fields and values associated with the second portion of requests, or a rule for determining requests associated with the second portion of requests.

4. The system of claim 1, wherein the processing device further includes instructions executable by the processing device for causing the processing device to generate the at least one compute node for servicing the second portion of requests by:
determining the first load associated with the base node exceeds a first threshold, the first load corresponding to the first portion of requests; and
in response to determining that the first load exceeds the first threshold, generating, by the base node, the at least one compute node for servicing the second portion of requests.

5. The system of claim 4, wherein the at least one compute node is configured to generate the additional compute node for servicing the subset of the second portion of requests by:
determining, by the at least one compute node, the second load associated with the at least one compute node exceeds a second threshold; and in response to determining the second load exceeds the second threshold, generating, by the at least one compute node, the additional compute node for servicing the subset of the second portion of requests.

6. The system of claim 2, wherein the indication of the second portion of requests comprises a first notification of a first redirection to the at least one compute node and a first validity time for the first redirection, and the at least one compute node is further configured to:
   determine a collective load of the base node and the at least one compute node is below a limit;
   subsequent to determining the collective load is below the limit, receive, by the at least one compute node, an additional request associated with the at least one compute node;
   redirect, by the at least one compute node, the additional request to the base node;
   send, by the base node, a response to the additional request, a second notification of a second redirection of the additional request, and a second validity time associated with the second redirection; and
   subsequent to the first validity time passing, shut down the at least one compute node.

7. The system of claim 1, wherein the additional compute node is configured to generate another compute node for servicing a portion of the subset of the second portion of requests.

8. A method comprising:
   determining a first load associated with a base node of a distributed computing system exceeds a first threshold, the first load corresponding to a plurality of requests of the distributed computing system having a first shared characteristic and the base node having a dynamic management function, wherein the plurality of requests corresponds to a first plurality of requests associated with a first geographic region;
   in response to determining that the first load exceeds the first threshold, generating, by the base node, a first compute node for servicing a subset of the plurality of requests of the distributed computing system having a second shared characteristic, the first compute node having the dynamic management function, wherein the subset of the plurality of requests corresponds to a second plurality of requests associated with a second geographic region within the first geographic region;
   sending, by the base node and in response to receiving a request associated with the first compute node from a client application, the request to the first compute node;
   providing, by the first compute node, a response to the request to the client application;
   determining, by the first compute node, a second load associated with the first compute node exceeds a second threshold; and
   in response to determining that the second load exceeds the second threshold, generating, by the first compute node, a second compute node for servicing a portion of the subset of the plurality of requests of the distributed computing system having a third shared characteristic, the second compute node having the dynamic management function, wherein the portion of the subset of the plurality of requests corresponds to a third plurality of requests associated with a third geographic region within the second geographic region.

9. The method of claim 8, further comprising:
   responding to the request with an indication of the subset of the plurality of requests associated with the first compute node.

10. The method of claim 9, wherein the indication of the subset of the plurality of requests includes customer identifiers associated with the subset of the plurality of requests, fields and values associated with the subset of the plurality of requests, or a rule for determining requests associated with the subset of the plurality of requests.

11. The method of claim 9, wherein the indication of the subset of the plurality of requests associated with the first compute node comprises a first notification of a first redirection to the first compute node and a first validity time for the first redirection, the method further comprising:
   determining a collective load of the first load and the second load is below a limit;
   subsequent to determining the collective load is below the limit, receiving, at the first compute node, an additional request associated with the first compute node;
   redirecting, by the first compute node, the additional request to the base node;
   sending, by the base node, a response to the additional request, a second notification of a second redirection of the additional request, and a second validity time associated with the redirection; and
   subsequent to the first validity time passing since a latest request served by the first compute node, shut down the first compute node.

12. The method of claim 8, wherein the base node is configured to provide an access point to the distributed computing system.

13. A non-transitory computer-readable medium comprising first program code executable by a first processor for causing the first processor to:
   determine a first load associated with a base node of a distributed computing system having a dynamic management function exceeds a first threshold, the first load corresponding to a plurality of requests of the distributed computing system having a first shared characteristic, wherein the plurality of requests corresponds to a first plurality of requests associated with a first geographic region;
   in response to determining that the first load exceeds the first threshold, generate, by the base node, a first compute node for servicing a subset of the plurality of requests of the distributed computing system having a second shared characteristic, wherein the subset of the plurality of requests corresponds to a second plurality of requests associated with a second geographic region within the first geographic region;
   send, by the base node and in response to receiving a request associated with the first compute node from a client application, the request to the first compute node, the first compute node having the dynamic management function and second program code executable by a second processor for causing the second processor to:
      provide, by the first compute node, a response to the request to the client application;
      determine, by the first compute node, a second load associated with the first compute node exceeds a second threshold; and
      in response to determining the second load exceeds the second threshold, generate, by the first compute node, a second compute node for servicing a portion of the subset of the plurality of requests of the distributed computing system having a third shared characteristic, the second compute node having the dynamic management function, wherein the portion of the subset of the plurality of requests corresponds to a third plurality of requests associated with a third geographic region within the second geographic region.

14. The non-transitory computer-readable medium of claim 13, wherein the second program code is further executable by the second processor for causing the second processor to:
respond to the request, by the first compute node, with an indication of the subset of the plurality of requests associated with the first compute node.

15. The non-transitory computer-readable medium of claim 14, wherein the indication of the subset of the plurality of requests includes customer identifiers associated with the subset of the plurality of requests, fields and values associated with the subset of the plurality of requests, or a rule for determining requests associated with the subset of the plurality of requests.

16. The non-transitory computer-readable medium of claim 14, wherein the indication of the subset of the plurality of requests associated with the first compute node comprises a first notification of a first redirection to the first compute node and a first validity time for the first redirection, and the second program code is further executable by the second processor for causing the second processor to:
determine a collective load of the first load and the second load is below a limit;
subsequent to determining the collective load is below the limit, receive, at the first compute node, an additional request associated with the first compute node;
redirect, by the first compute node, the additional request to the base node;
send, by the base node, a response to the additional request, a second notification of a second redirection of the additional request, and a second validity time associated with the second redirection; and
subsequent to the first validity time passing since a latest request served by the first compute node, shut down the first compute node.

17. The non-transitory computer-readable medium of claim 13, wherein the base node is configured to provide an access point to the distributed computing system.

18. The non-transitory computer-readable medium of claim 13, wherein the first threshold and the second threshold are equal.

* * * * *